Dec. 30, 1969　　　　J. H. GRIER, JR　　　　3,486,586

PEDAL CRANK ACTUATED BICYCLE WHEEL RIM BRAKES

Filed Dec. 22, 1967　　　　　　　　　　　3 Sheets-Sheet 1

Joseph H. Grier, Jr.
INVENTOR.

BY *Clarence A. O'Brien*
and *Harvey B. Jackson*
Attorneys

Dec. 30, 1969    J. H. GRIER, JR    3,486,586
PEDAL CRANK ACTUATED BICYCLE WHEEL RIM BRAKES
Filed Dec. 22, 1967    3 Sheets-Sheet 2

Joseph H. Grier, Jr.
INVENTOR.

BY *Clarence A. O'Brien*
*and Harvey B. Jacobson*
Attorneys

Dec. 30, 1969   J. H. GRIER, JR   3,486,586
PEDAL CRANK ACTUATED BICYCLE WHEEL RIM BRAKES
Filed Dec. 22, 1967   3 Sheets-Sheet 3

Joseph H. Grier, Jr.
INVENTOR.

United States Patent Office 3,486,586
Patented Dec. 30, 1969

3,486,586
PEDAL CRANK ACTUATED BICYCLE WHEEL
RIM BRAKES
Joseph H. Grier, Jr., 24307 6¼ Ave.,
Corcoran, Calif. 93212
Filed Dec. 22, 1967, Ser. No. 693,022
Int. Cl. B62l 1/06
U.S. Cl. 188—24                                    11 Claims

ABSTRACT OF THE DISCLOSURE

A brake actuator for a bicycle including a pedal crank mechanism having a one-way drive connection with a drive wheel of a bicycle for forwardly driving the drive wheel upon rotation of the crank assembly in one direction and also at least slightly rotatable in the opposite direction, the brake actuating mechanism including a brake actuator oscillatably supported from the frame of the bicycle, connected to the brake assembly for actuating the latter in response to rotation of the actuator in one direction, and a one-way drive connection between the crank assembly and the actuator for rotation of the latter in one direction of rotation thereof in response to rotation of the crank assembly in the opposite direction of rotation thereof.

---

The bicycle brake assembly actuator of the instant invention has as its main object to provide a means whereby caliper-type brakes of an associated bicycle may be conveniently actuated when desired. Although the brake actuator has been specifically designed for use in conjunction with caliper-type bicycle brakes, it is to be noted that the actuator may also be utilized in conjunction with drum type expanding or contracting brake mechanisms.

Another object of this invention is to provide a brake actuator operatively associated with the pedal crank assembly of a bicycle in a manner such that the brake actuator may be automatically operated to actuate the associated brake assembly in response to the pedal crank assembly being slightly rotated in a reverse direction.

Still another object of this invention is to provide a pedal crank actuated brake actuator which may be readily incorporated into existing pedal crank journaling hubs.

A final object of this invention to be specifically enumerated herein is to provide a pedal crank brake actuator for bicycles which will confirm to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a bicycle including front and rear caliper-type brakes and with the brake actuator of the instant invention operatively associated with the caliper-type brake assemblies and with the pedal crank assembly of the bicycle for actuation by the latter;

FIGURE 2 is a view similar to FIGURE 1 illustrating the brake assembly actuator of the instant invention operatively associated with a bicycle provided with a conventional rear coaster brake assembly and a caliper-type brake assembly operatively associated with its front wheel and the brake actuator of the instant invention operatively connected between the pedal crank assembly of the bicycle and the front caliper brake assembly;

Figure 1:
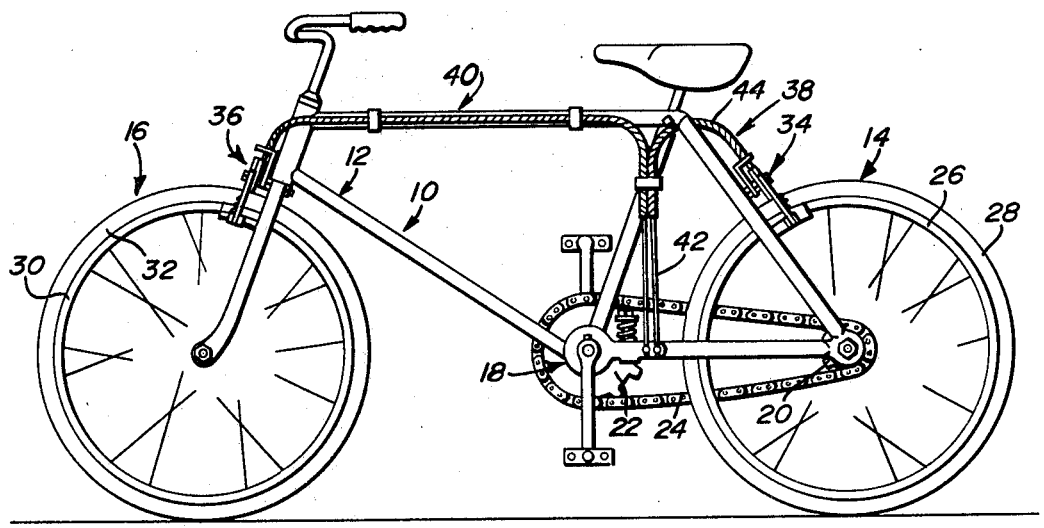
Figure 4:
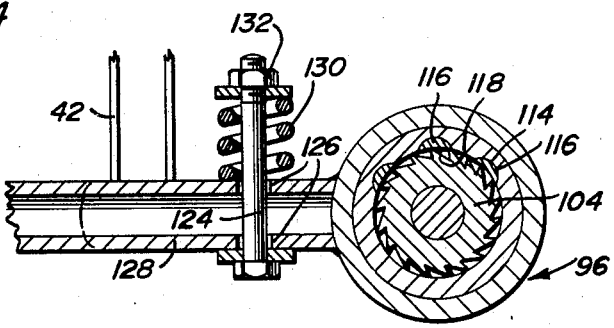
FIGURE 4 is a fragmentary vertical sectional view taken substantially upon the plane indicated by the section line 4—4 of FIGURE 3.
Figure 5:
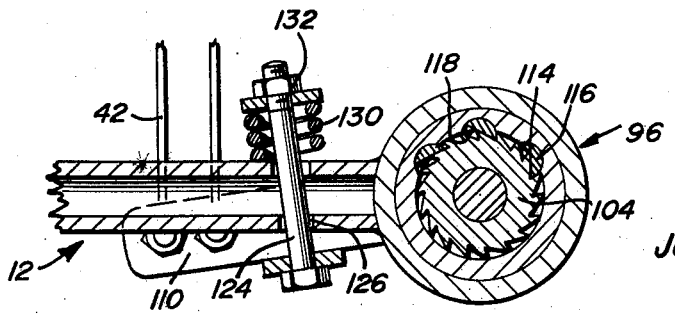
FIGURE 5 is a view similar to FIGURE 4 but with the brake actuating mechanism in the applied position.

Referring now more specifically to the drawings, the numeral 10 generally designates a two-wheeled bicycle including a frame generally referred to by the reference numeral 12, a rear wheel 14, a front wheel 16, and a pedal crank assembly generally referred to by the reference numeral 18.

The rear driving wheel 14 includes a driven sprocket 20 having a one-way drive connection with the rear wheel 14 and relative to which the rear wheel 14 may free wheel. Further, the sprocket 20 may be at least slightly rotated in a reverse direction relative to the frame 12 independent of rotation of the wheel 14. The pedal crank assembly 18 includes a drive sprocket 22 drivingly connected to the sprocket 20 through an endless chain 24. The rear wheel 14 includes a spoked rim 26 and a suitable tire 28 while the front wheel 16 includes a spoked rim 30 and a tire 32. The bicycle 10 includes a rear caliper brake assembly generally referred to by the reference numeral 34 operative associated with the rear rim 26 and a front caliper brake assembly generally referred to by the reference numeral 36 operatively associated with the front rim 30. The caliper brake assemblies 34 and 36 are substantially identical in configuration with the rear brake assembly being actuated by a cable assembly referred to in general by the reference numeral 38 and the front brake assembly being actuated by a similar cable assembly 40, the brake actuating cable assembly 38 including an elongated flexible inner core 42 and a flexible outer casing 44. Inasmuch as the brake assembly 34 is substantially identical to the brake assembly 36, only the brake assembly 36 will be specifically described hereinafter.

The brake assembly 36 includes a mounting fastener 46 secured through the front fork assembly 48 of the bicycle 10 and upon which there is stationarily mounted a bracket 50 for supporting one end of the outer casing 52 of the cable assembly 40. A pair of crossed caliper arms 54 and 56 are pivotally supported from the mounting fastener 46 forward of the bracket 50 and include short end portions provided with laterally projecting mounting lug portions 58 and 60. A pair of connecting links 62 and 64 are pivotally connected to the mounting lug portions 58 and 60 at one pair of corresponding ends and to each other at the other set of corresponding ends by means of a suitable fastener 66. The flexible inner core 68 of the cable assembly 60 has its adjacent end secured to the fastener 66 and an expansion spring 70 is secured between the fastener 66 and the fastener 46 and yieldably urges the fastener 66 toward the fastener 46.

The caliper arms 54 and 56 each has two sets of apertures 72 and 74 formed therein and spaced longitudinally of the free end portion of the caliper arm remote the fastener 46. An elongated brake shoe 76 is provided for each caliper arm 54 and 56 and includes a pair of flange portions 78 and 80 angularly disposed relative to each other and having any suitable brake lining 82 secured thereto. Further, each of the brake shoes 76 includes a pair of laterally projecting mounting lug portions 84 pivotally secured to opposite sides of the corresponding caliper arm by means of a suitable fastener 86 secured through a selected one of the apertures 74. Each lug portion 84 includes an aperture 88 and an expansion spring 90 has one end anchored in the aperture 88 and the other end anchored in one of the corresponding apertures 74.

Figure 7:
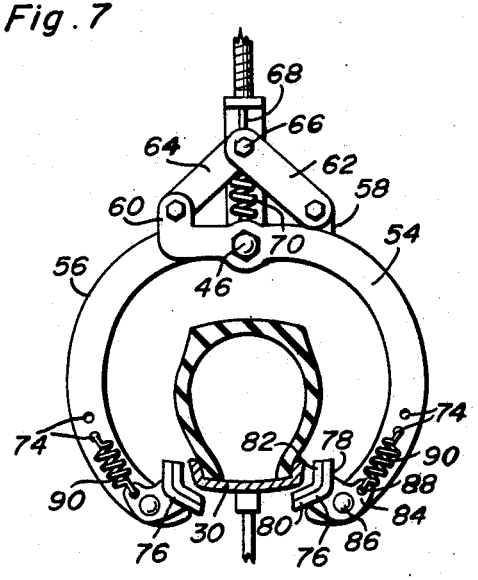
FIGURE 7 is a fragmentary vertical sectional view in which the front wheel caliper brake assembly of FIGURES 1 and 2 is illustrated in elevation.
Figure 8:
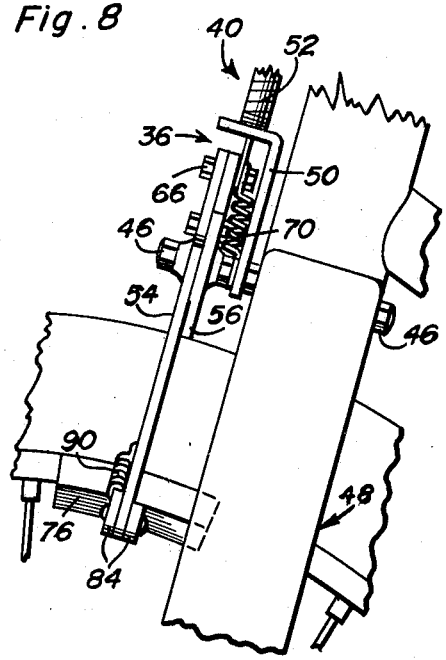
FIGURE 8 is a side elevational view of the assemblage illustrated in FIGURE 7.
Figure 9:
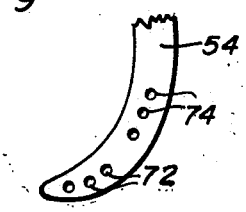
FIGURE 9 is a fragmentary elevational view of the free end portion of one of the pivoted levers of the caliper brake assembly.
Figure 3:
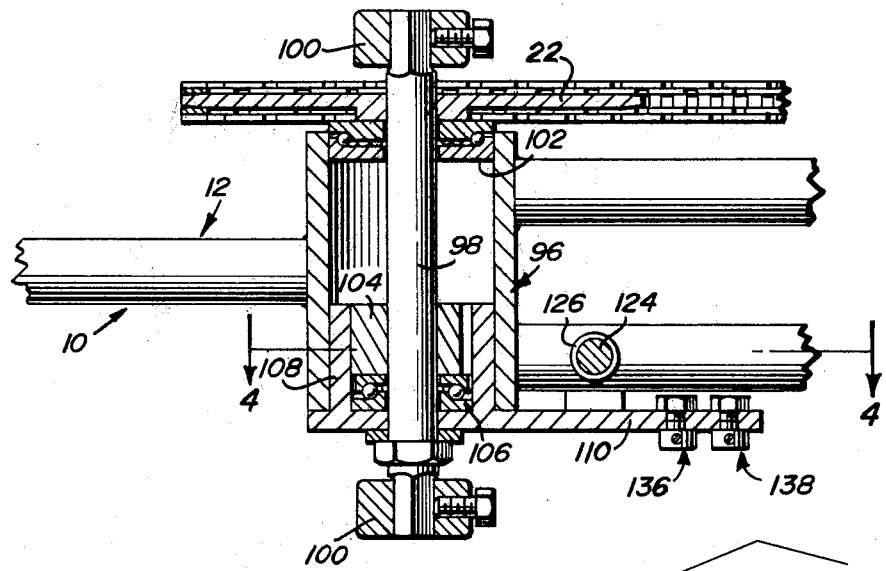
FIGURE 3 is an enlarged fragmentary horizontal sectional view taken substantially upon a plane passing through the center of the pedal crank hub of the bicycle illustrated in FIGURE 1.
Figure 6:
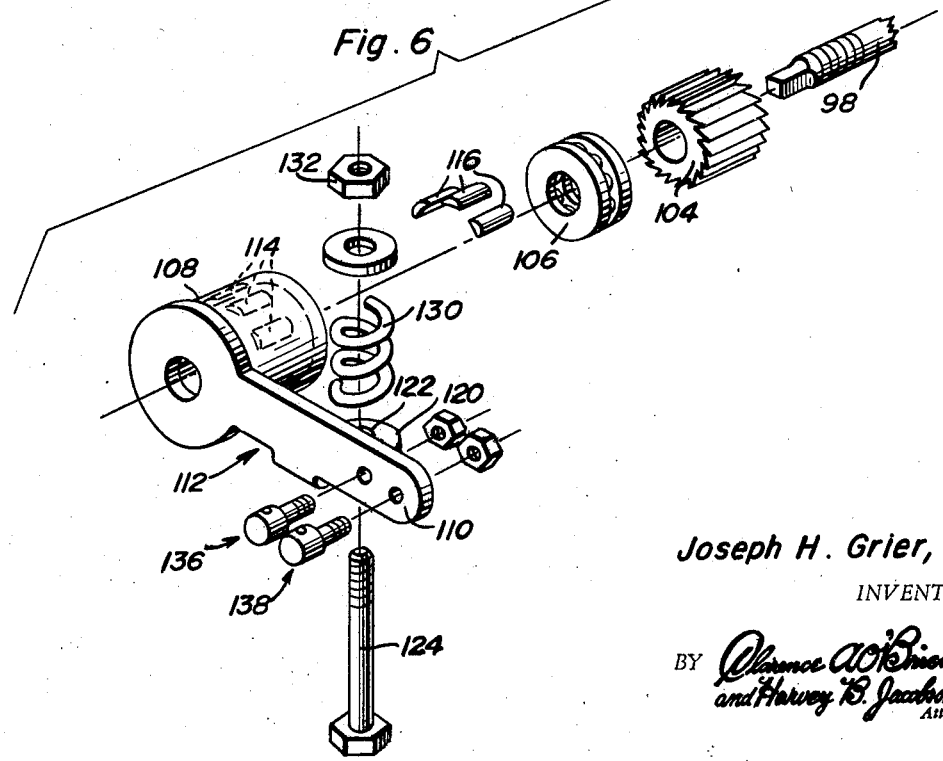
FIGURE 6 is an exploded perspective view of the brake actuating mechanism.

From FIGURE 7 of the drawings it may be seen that the angle defined between the flange portions 78 and 80 conforms generally to the corner defined by the adjacent side of the rim 30 and therefore that each brake shoe 76 will snugly embrace the adjacent portions of the rim 30, the brake shoe 76 being slightly longitudinally bowed so as to conform to the radius of curvature of the rim 30.

By exerting a pull on the end of the inner core 68 remote from the fastener 66, the fastener 66 will be shifted away from the fastener 46 and the free ends of the caliper arms 54 and 56 will swing together so as to engage the brake linings 82 with the opposite side portions of the rim 30 and thus brake the front wheel 16. Of course, the spring 70 serves to return the caliper arms 54 and 56 to the rest positions illustrated in FIGURE 7 of the drawings after the brakes have been applied so as to shift the brake shoes 76 away from the rim 30. The plurality of apertures 72 formed in the caliper arms 54 and 56 adapt the brake assembly 36 for operation in conjunction with wheel rims of different configurations and of different thicknesses and the plurality of apertures 74 on each caliper arm 54, 56 enable the positioning springs 90 to be generally equally tensioned in each mounting position of the brake shoes 76 on the caliper arms 54 and 56. Of course, the pivotal mounting of the brake shoes 76 further adapts the brake assembly 36 to conform to different wheel rims and to insure that maximum contact between the brake linings 82 and any associated wheel rim will be afforded.

Referring now more specifically to FIGURES 3–6, the bicycle frame 12 includes a pedal crank assembly support hub generally referred to by the reference numeral 96. The pedal crank assembly 18 includes a shaft portion 98 extending through the hub 96 and a pair of pedal supporting crank arms 100 secured to opposite end portions of the shaft 98 as well as the drive sprocket 22 which is also mounted on the shaft 98 for rotation therewith.

One end of the shaft portion 98 is journaled in the corresponding end of the hub 96 by means of a bearing assembly 102 and the other end of the shaft portion 98 has a toothed ratchet wheel 104 mounted thereon for rotation therewith and is journaled from the hub 96 by means of a bearing assembly 106 journaling the shaft portion 98 from a sleeve portion 108 snugly and oscillatably received within the corresponding end of the hub 96.

The sleeve portion 108 comprises an integral portion of an actuating arm 110 of the brake actuating assembly generally referred to by the reference numeral 112 of which the ratchet wheel 104 also comprises a part.

The sleeve portion 108 includes a plurality of circumferentially spaced and inwardly opening generally semi-cylindrical recesses 114 and a plurality of ratchet dog members 116 which are generally semi-cylindrical in configuration are snugly and oscillatably received in the recesses 114. The ratchet dog members 116 are of a size to at least substantially fill the recesses 114 and yet not to project outwardly therefrom when properly positioned therein. The ratchet dog members 116 include partial cylindrical surfaces 118 including a radius of curvature generally equal to the radius of curvature of the inner surfaces of the sleeve portion 108 and it may be seen from FIGURE 4 of the drawings that the maximum diameter of the toothed ratchet wheel 104 is but slightly less than the inside diameter of the sleeve portion 108. Further, it may also be seen that the width of the ratchet dog members 116 is slightly less than the distance between three adjacent teeth of the ratchet wheel 104.

The arm 110 is of course oscillatably supported through the sleeve portion 108 being oscillatably received within the adjacent end of the hub 96 and includes a laterally directed abutment flange 120 provided with a suitable aperture 122. A limit fastener 124 is secured through the aperture 122 and also through aligned apertures 126 formed in an adjacent portion 128 of the frame 12 and a compression spring 130 is disposed about the fastener 124 between the portion 128 of the frame 12 and an abutment member 132 carried by the end of the fastener 124 remote from the abutment flange 120. Accordingly, the spring 130 serves to yieldingly urge the arm 110 to the position thereof illustrated in FIGURE 4 of the drawings and to yieldingly retain the arm 110 against movement to the position thereof illustrated in FIGURE 5 of the drawings. From the above it may be appreciated that the shaft portion 198 includes a one-way drive connection with the arm 110 whereby the shaft portion 198 may rotate forwardly relative to the arm 110 but will be operative to drive the arm 110 rearwardly upon rearward rotation of the shaft portion 198.

The end of the core 68 remote from the fastener 46 is secured to the free end of the arm 110 by means of a suitable anchoring fastener assembly generally referred to by the reference numeral 136 and the end of the core 42 remote from the brake assembly 34 is also connected to the free end of the arm 110 by means of a fastener assembly generally referred to by the reference numeral 138 comprising a substantial duplicate of the fastener assembly 136.

In operation, the bicycle 10 may be propelled forward by the rider of the bicycle causing the crank assembly 18 to be rotated in a forward direction. Then, when it is desired to brake the bicycle 10, the crank assembly 18 is oscillated in a rearward or clockwise direction as viewed in FIGURE 1 of the drawings so as to rotate the ratchet wheel 104 in a counterclockwise direction as viewed in FIGURE 4 of the drawings to the position thereof illustrated in FIGURE 5 of the drawings thereby causing the ratchet dogs 116 to shift from the positions thereof illustrated in FIGURE 4 of the drawings to the positions thereof illustrated in FIGURE 5 of the drawings. This of course will lock the ratchet wheel 104 to the sleeve portion 108 and thus cause the arm 110 to shift from the position thereof illustrated in FIGURE 4 to the position thereof illustrated in FIGURE 5 so as to exert a pull on both the cores 42 and 68.

Prior to actuation of the brake assemblies 34 and 36 the inner ends of the brake shoes 76 thereof are dropped slightly downwardly by the compression springs 90. However, engagement of the brake linings 82 with the rims 26 and 30 serves to pivot the brake shoes 76 to positions with the brake linings 82 in full, or at least substantially full, engagement with the corresponding sides of the rims 26 and 30.

Figure 2:
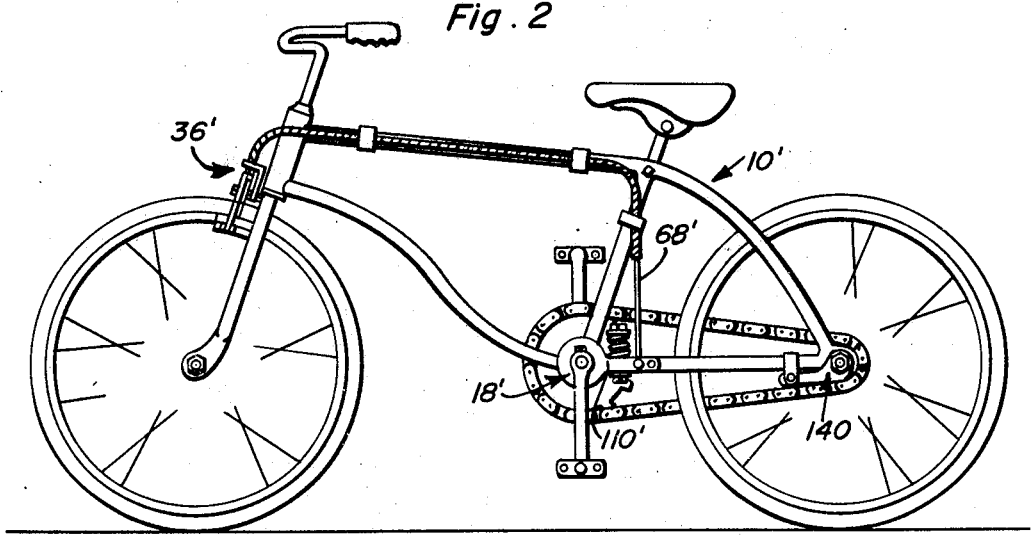

In FIGURE 2 of the drawings there is illustrated a bicycle generally designated by the reference numeral 10' and which is substantially identical to the bicycle 10 and has its corresponding parts referred to by prime numerals corresponding to the numerals applied to the similar parts of the bicycle 10.

The bicycle 10' differs from the bicycle 10 only in that the bicycle 10' includes a conventional coaster brake assembly generally referred to by the reference numeral 140 in lieu of a rear brake assembly such as brake assembly 34. Accordingly, the arm 110' has only the core 68' of the front brake assembly generally referred to by the reference numeral 36' operatively connected thereto. Of course, the coaster brake assembly 140 is actuated in the usual manner by back pedalling the crank assembly 18' and it is to be noted that the necessary back pedalling motion of the pedal crank assembly 18' to actuate the coaster brake assembly 140 is substantially identical to the back pedalling motion of the pedal crank assembly 18′ necessary to actuate the front wheel caliper brake assembly 36′.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to.

What is claimed as new is as follows:

1. In combination with a bicycle of the type including a frame, a pair of supporting wheels journaled from the frame, a wheel brake assembly operatively associated with at least one of said wheels, and a drive crank assembly journaled from said frame including a one-way drive connection with a drive wheel of said bicycle for forwardly driving said drive wheel upon rotation of said crank assembly in one direction and also at least slightly rotatable in the opposite direction, a brake actuating mechanism, said mechanism including a brake actuator oscillatably supported from said frame, means connected between said actuator and said brake assembly for actuating the latter in response to rotation of said actuator in one direction, and a one-way drive connection between said crank assembly and said actuator for rotation of the latter in said one direction of rotation thereof in response to rotation of said crank assembly in said opposite direction of rotation thereof, said crank assembly including a toothed ratchet wheel concentrically mounted thereon for rotation therewith with the teeth thereon opening in said one direction of rotation of said crank assembly, said actuator including a sleeve portion concentrically disposed about and snugly receiving said ratchet wheel therein and including at least one longitudinally extending inwardly opening generally semi-cylindrical recess formed therein, said one-way drive connection between said crank assembly and actuator including a semi-cylindrical ratchet dog member disposed and oscillatable in said recess and including an inwardly facing partial cylindrical surface shiftable to a first position forming at least a general continuation of the adjacent inner cylindrical surfaces of said sleeve portion with no drive connection established between said crank assembly and said actuator and a second position with one side of said ratchet dog member projecting between adjacent teeth of said ratchet wheel and thereby establishing a drive connection between said crank assembly and said sleeve portion upon rotation of said crank assembly in the direction in which said teeth open.

2. The combination of claim 1 including means operatively connected between said frame and said actuator yieldingly urging said actuator to rotate in the other direction of rotation thereof.

3. The combination of claim 1 wherein said ratchet dog member is freely oscillatable between said first and second positions.

4. The combination of claim 3 wherein the distance between the free ends of adjacent teeth on said ratchet wheel is at least slightly greater than one half the width of the inwardly facing surface of said ratchet dog member.

5. The combination of claim 4 wherein said sleeve portion includes a plurality of said recesses spaced circumferentially thereabout and a ratchet dog member is oscillatably disposed in each of said recesses.

6. In combination with a bicycle of the type including a frame, a pair of supporting wheels journalled from the frame, a wheel brake assembly operatively associated with at least one of said wheels, and a drive crank assembly journaled from said frame including a one-way drive connection with a drive wheel of said bicycle for forwardly driving said drive wheel upon rotation of said crank assembly in one direction and also at least slightly rotatable in the opposite direction, a brake actuating mechanism, said mechanism including a brake actuator oscillatably supported from said frame, means connected between said actuator and said brake assembly for actuating the latter in response to rotation of said actuator in one direction, and a one-way drive connection between said crank assembly and said actuator for rotation of the latter in said one direction of rotation thereof in response to rotation of said crank assembly in said opposite direction of rotation thereof, said brake assembly comprising a caliper brake assembly including a pair of oscillatable brake arms supported from said frame for movement of one pair of corresponding ends of said arms toward and away from each other and opposite sides of a wheel rim of said bicycle disposed therebetween, a pair of brake shoes, means oscillatably supporting said shoes from said one pair of ends of said arms for oscillation relative thereto about axes generally paralleling the axes of oscillation of said arms relative to said frame, means operatively connected between said shoes and arms yieldingly urging said shoes toward predetermined rotated positions relative to said arms.

7. The combination of claim 6 wherein the last-mentioned means includes means for adjusting the biasing force applied to said shoes.

8. In combination with a bicycle of the type including a frame, a pair of supporting wheels journalled from the frame, a wheel brake assembly operatively associated with at least one of said wheels, and a drive crank assembly journaled from said frame including a one-way drive connection with a drive wheel of said bicycle for forwardly driving said drive wheel upon rotation of said crank assembly in one direction and also at least slightly rotatable in the opposite direction, a brake actuating mechanism, said mechanism including a brake actuator oscillatably supported from said frame, means connected between said actuator and said brake assembly for actuating the latter in response to rotation of said actuator in one direction, and a one-way drive connection between said crank assembly and said actuator for rotation of the latter in said one direction of rotation thereof in response to rotation of said crank assembly in said opposite direction of rotation thereof, said brake assembly comprising a caliper brake assembly including a pair of oscillatable brake arms supported from said frame for movement of one pair of corresponding ends of said arms toward and away from each other and opposite sides of a wheel rim of said bicycle disposed therebetween, a pair of brake shoes, means oscillatably supporting said shoes from said one pair of ends of said arms for oscillation relative thereto about axes generally paralleling the axes of oscillation of said arms relative to said frame, the last-mentioned means including means operative to adjustably shift the axis of oscillation of each of said shoes longitudinally of the associated arm.

9. A caliper brake assembly including a pair of brake arms adapted to be oscillatably supported from a bicycle frame for movement of one pair of corresponding brake arms supported from said frame for movement of one pair of corresponding ends of said arms toward and away from each other and opposite sides of a wheel rim of said bicycle disposed therebetween, a pair of brake shoes, means oscillatably supporting said shoes from said one pair of ends of said arms for oscillation relative thereto about axes generally paralleling the axes of oscillation of said arms relative to said frame, means operatively connected between said shoes and arms yieldingly urging said shoes toward predetermined rotated positions relative to said arms.

10. A caliper brake assembly including a pair of brake arms adapted to be oscillatably supported from a bicycle frame for movement of one pair of corresponding brake arms supported from said frame for movement of one pair of corresponding ends of said arms toward and away from each other and opposite sides of a wheel rim of said bicycle disposed therebetween, a pair of brake shoes, means oscillatably supporting said shoes from said one pair of ends of said arms for oscillation relative thereto about axes generally paralleling the axes of oscillation of said arms relative to said frame, the last-mentioned means including means operative to adjustably shift the axis of oscillation of each of said shoes longitudinally of the associated arm.

11. The combination of claim 9 wherein the last-mentioned means includes means for adjusting the biasing force applied to said shoes.

References Cited

UNITED STATES PATENTS

| 508,269 | 11/1893 | Bartel | 188—24 |
| 1,949,702 | 3/1934 | Wennerstrom | 192—41 |
| 3,003,593 | 10/1961 | Luenberger | 192—41 X |

FOREIGN PATENTS

| 522,059 | 7/1940 | Great Britian. |

MILTON BUCHLER, Primary Examiner

T. W. BUCKMAN, Assistant Examiner

U.S. Cl. X.R.

192—41